July 18, 1967 A. KLEIN 3,331,372
FOUNDATION GARMENTS
Filed Aug. 9, 1965 2 Sheets-Sheet 1
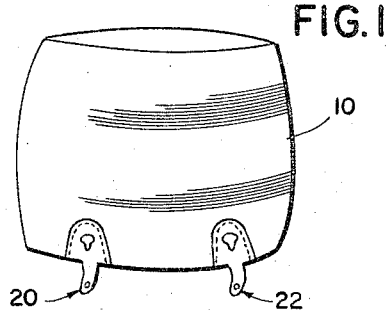
FIG.1
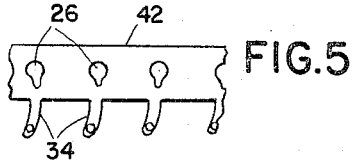
FIG.5
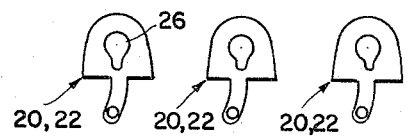
FIG.6
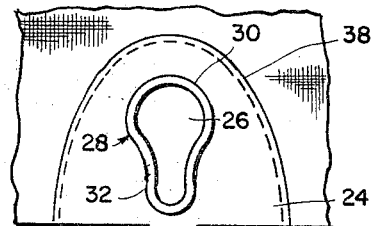
FIG.2
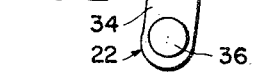
FIG.7
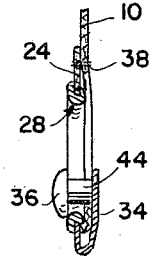
FIG.9
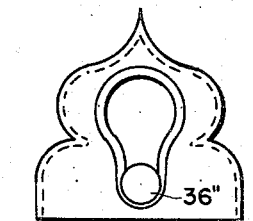
FIG.3
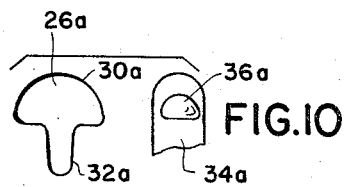
FIG.8
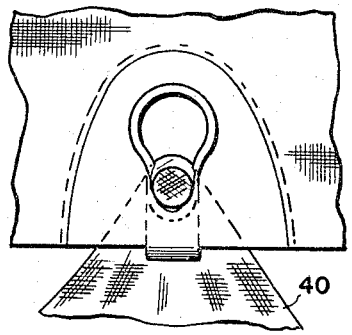
FIG.4
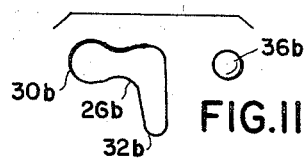
FIG.10
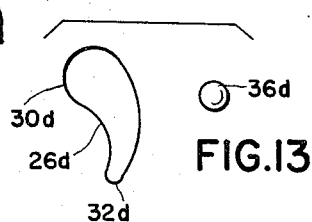
FIG.12
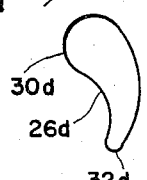
FIG.11
FIG.13
*INVENTOR.*
ANNE KLEIN
BY LACKENBACH & SIEGEL July 18, 1967 A. KLEIN 3,331,372
FOUNDATION GARMENTS
Filed Aug. 9, 1965 2 Sheets-Sheet 2

INVENTOR.
ANNE KLEIN
BY LACKENBACH & SIEGEL
ATTORNEYS.

United States Patent Office 3,331,372
Patented July 18, 1967

3,331,372
FOUNDATION GARMENTS
Anne Klein, 166 E. 65th St., New York, N.Y. 10021
Filed Aug. 9, 1965, Ser. No. 478,118
10 Claims. (Cl. 128—535)

ABSTRACT OF THE DISCLOSURE

Foundation garments, comprising fastener structure comprising, in turn, a keeper panel connected with a portion of the foundation garment adjacent the lower marginal portion thereof; said keeper panel having a keeper element lining and re-enforcing an aperture extending therethrough; and a stud member having a stud head extending therefrom for cooperation with said keeper element adjacent the lower marginal portion of said foundation garment, rendering such fastener structure virtually invisible or inconspicuous during use even when the wearer assumes a sitting or bending position, since it will not be visible at the lower marginal portion of an outer garment.

---

It is a primary object of the present invention to provide a foundation garment, such as a girdle, panty-girdle, and the like, that is constructed and arranged to present fastener structure, such as hosiery supporters or garters, for removably connecting a plurality of articles, for example, a pair of hosiery, thereto in such a manner as to render said fastener structure virtually inconspicuous or invisible when in use.

Another primary object of this invention, in addition to the foregoing objects, is to provide a foundation garment, that is constructed and arranged to present fastener structure that is capable of fabrication as an integral part of said foundation garment, or as a separate element which can then be attached to the foundation garment in any suitable manner, to render said fastener structure virtually inconspicuous or invisible when in use.

An additional primary object of this invention, in addition to the foregoing objects, is to provide a foundation garment comprising fastener structure at or adjacent the lower marginal portion of the garment, rendering such fastener structure virtually invisible or inconspicuous during use even when the wearer assumes a sitting or bending position, since it will not be visible at the lower marginal portion of an outer garment, enabling the presentation of a foundation garment that will appeal to the fastidious women, notwithstanding present style trends of short outer garments, and will not cause embarrassment by exposure of the fastener structure.

Other objects and important features of the present invention will be apparent from a study of the specification following taken with the drawings, which together show, illustrate, describe and disclose a preferred embodiment or modification of the invention and what is now considered to be the best mode of practicing the principles thereof. Other embodiments or modifications may be suggested to those having the benefit of the teachings herein, and such other embodiments or modifications are intended to be reserved especially as they fall within the scope and spirit of the sub-joined claims.

In the drawings:

FIGURE 1 is a perspective view of a foundation garment constructed in accordance with the principles of the present invention, showing fastener structure of the invention as forming a part thereof;

FIGURE 2 is an enlarged detailed view of the fastener structure shown in FIGURE 1, and illustrated in an open position, taken from the inside of the foundation garment illustrated in FIGURE 1;

FIGURE 3 is a view similar to FIGURE 2, but illustrating the fastener structure in a closed or operative position;

FIGURE 4 is a view of the fastener structure from the outside or front of the foundation garment shown in FIGURE 1, illustrating the manner in which a stocking will be held or gripped;

FIGURE 5 is a schematic view illustrating one step in a method of fabricating the fastener structure illustrated in FIGURES 1–4;

FIGURE 6 is another step in the method shown in FIGURE 5;

FIGURE 7 is a view similar to FIGURES 2–4, but illustrating a decorative modification of the fastener structure illustrated therein;

FIGURE 8 is a view similar to FIGURE 7, but illustrating another decorative modification;

FIGURE 9 is a cross-sectional view taken along the line 9—9 of FIGURE 3;

FIGURE 10 is an exploded view of another embodiment of fastener structure constructed in accordance with the principles of the present invention;

FIGURE 11 is a view similar to FIGURE 10, showing yet another embodiment of fastener structure;

FIGURE 12 is a view similar to FIGURES 10 and 11, showing a further embodiment of fastener structure;

FIGURE 13 is a view similar to FIGURES 10–12, showing a still further embodiment of fastener structure;

Figure 14:
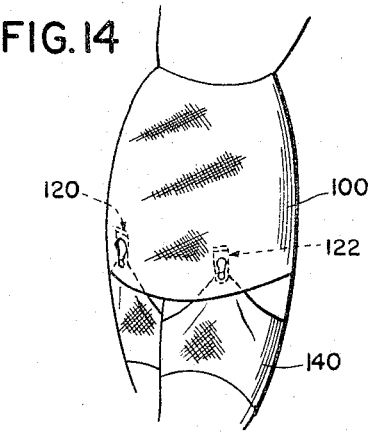
FIGURE 14 is a perspective view illustrating a modification of the foundation garment shown in FIGURE 1.
Figure 16:
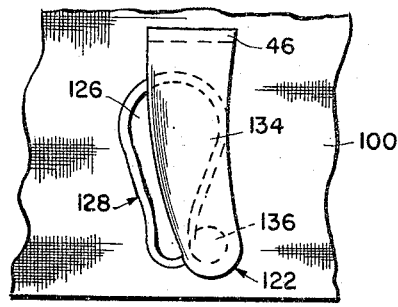
FIGURE 16 is a view similar to FIGURE 15, but taken from the inside of the foundation garment shown in FIGURE 14.
Figure 15:
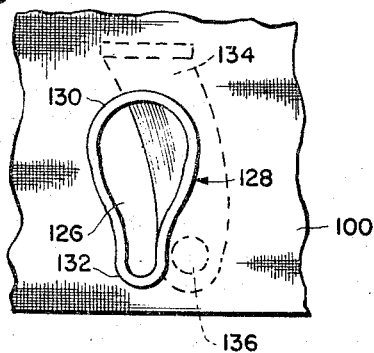
FIGURE 15 is an enlarged detailed view of the fastener structure that forms an element of the foundation garment illustrated in FIGURE 14, taken from the outside thereof.
Figure 17:
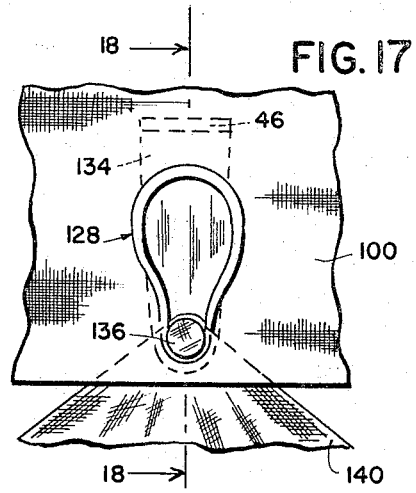
FIGURE 17 is a view similar to FIGURE 15, illustrating the fastener structure in a closed or operative position, and the manner in which a stocking is gripped or held thereby.

With particular reference now to the drawings, and particularly to FIGURE 1, there is illustrated therein a foundation garment constructed in accordance with the principles of the present invention, and designated by the reference character 10. The garment 10 is illustrated as being of the slip-on type for exemplary purposes only, it being understood that the present invention is equally applicable to other types of foundation garments, such as panty-girdles, garter belts, and in general to any type of under garment that is constructed and arranged to present the requisite characteristic of sufficient strength. In addition, it will be understood that the foundation garment 10 can be fabricated in any suitable manner, and of any suitable material or combination of fabrics.

The foundation garment or girdle 10 comprises a plurality of fastening assemblies 20 and 22, which may also be denoted as hosiery supporters or garters. The fastening assemblies 20 and 22 are of identical construction, it being necessary therefore to present a detailed description of only one. Accordingly, and with particular reference now to FIGURES 2–4, the fastening assembly, hosiery supporter or garter 22 will be seen to comprise a keeper panel 24 that may be fabricated of any suitable material.

Preferably, the chosen fabric should be of a heavy duty nature. The keeper panel 24 comprises an aperture 26 of key-hole-shaped configuration. A keeper or keeper element 28 of corresponding configuration extends about the periphery of the aperture 26, and is affixed to the panel 24 in any suitable manner. The keeper, in addition to performing other functions, hereinafter to be described, performs the function of reinforcing the panel 24 at the periphery of the aperture 26, and may be fabricated of any suitable material, such as metal or plastic. The keeper 28 itself will be seen to comprise a wide portion 30 and a narrow portion 32.

The fastener assembly 22, or hosiery supporter or garter, further comprises a stud member 34 which, in the illustrated embodiment is fabricated integrally with the keeper panel 24, and extends outwardly or downwardly therefrom. It will be understood, however, that the stud member 34 can be fabricated as a separate piece, and connected to the keeper panel 24 in any suitable manner. A stud head 36, which may be fabricated of any suitable material, such as rubber or plastic, is mounted on the stud member in any suitable manner.

The fastener assembly 22, or hosiery supporter or garter, as thus far described, is formed, manufactured or fabricated separately of the foundation garment 10. It may be connected thereto in any suitable manner, as for example through the medium of stitching 38. It is within the scope of the present invention that the fastener assemblies 20 and 22 be fabricated or manufactured integrally with the foundation garment 10. In either instance, it is to be remembered that, as pointed out above, the stud member 34 can itself be fabricated integrally with or separately of the keeper panel 24.

In the use and operation of the foundation garment 10 and fastener assemblies 20 and 22, all constructed in accordance with the principles of the present invention, the welt or top marginal portion 40 of a stocking is positioned against the stud head 36 of the stud member 34. The stud member 34 is then folded inwardly of the garment 10 to a location at which the stud head 36, with the stocking welt 40 folded or positioned there against can be inserted through the wide portion 30 of the keeper 28. Once inserted through the wide portion, this combination of stocking welt and stud head is then drawn or moved into the narrow portion 32 of the keeper, that is, moved to an operative position of the fastener assembly. In this position, the stud head 36 will be frictionally engaged within the narrow portion 32 of the keeper 28, thus gripping and securely holding and maintaining the stocking welt 40 and thus the stocking therein. At this point, it will be understood that, while the garment 10 has been illustrated as comprising a pair of fastener assemblies only at the front thereof, a similar pair will be positioned at the rear thereof.

With particular reference now to FIGURES 5 and 6, it will be seen that fastener assemblies constructed in accordance with the principles of this invention are capable of being fabricated by "gang" manufacturing techniques, that is, in strips of substantial quantities. As an example, if the fastener assemblies are fabricated of a plastic material of suitable dimensions and weight, such as a thermo-plastic material, a heat stamping process may be utilized to produce a strip 42 comprising a plurality of apertures 26 and a corresponding number of stud members 34. Subsequently, the strip 42 may be cut to produce the individual fastener assemblies 20, 22, and the apertures 26 lined and reinforced by the keepers 28.

With particular reference now to FIGURES 7 and 8, wherein like reference characters indicate like parts, but wherein the reference characters are primed once and twice over, respectively, there are illustrated therein decorative modifications of the fastener assemblies hereinbefore described. More particularly, a substantial portion of the edge or periphery of the fastener assemblies are cut, shaped or configured to result in a certain aesthetic appearance.

With particular reference now to FIGURES 10–13 wherein like reference characters indicate like parts, but wherein the suffixes a, b, c and d, respectively, are added, there are illustrated therein certain functional modifications of the fastener assemblies hereinabove described. More particularly, it will be understood that the scope of the present invention is not to be limited to the conventional shape and configuration of the aperture 26 and the stud member 34. Thus, in FIGURE 10, the aperture 26a is generally of T-shaped configuration, with the wide portion 30a being substantially semi-circular in form. The stud head 36a is similarly of semi-circular configuration. In FIGURE 11, the aperture 26b is of angular and curvilinear configuration, the stud head 36b being generally of angular configuration. The narrow portion 32b is slightly tapered to insure a firm frictional relationship between the keeper (not shown in FIGURES 10–13) and the stud head 36b. In FIGURE 12, the aperture 26c is again of angular configuration, but the narrow portion 32c is not tapered. In fact, the wide portion 30c and the narrow portion can be of substantially the same shape and dimensions, since, in this embodiment, the stud head 36c is generally of elliptical configuration. In the operation of this embodiment, the stud head 36 may be inserted through the portion 30c since its major axis extends in the same direction as the long dimension of that portion, and will be firmly frictionally maintained in the portion 32c since its major axis is perpendicular to the long dimension of this portion. In FIGURE 13, the stud head 36d is again generally of annular configuration, while the aperture 26d is generally of tear drop shaped configuration, thus presenting the wide portion 30d and the narrow portion 32d.

As pointed out above, the keeper 28 is not shown in FIGURES 10–13. However, it will be understood that fastener assemblies constructed in accordance with the principles of these figures will comprise such a keeper extending about the periphery of the aperture, and being of corresponding configuration, to line and reinforce the same.

At this point, it is to be understood that terminology such as "key-hole-shaped configuration" is to be interpreted and construed in its broadest possible sense, since this language is not in any way intended to be limiting. Rather, this language is intended to mean only that an aperture is provided having a wide portion and a narrow portion, relative to the stud head, enabling a stud head to be inserted through the former, and firmly frictionally held, gripped and engaged in the latter portion. With respect to the manner in which the stud head cooperates with the narrow portion of the keeper, reference is now had particularly to FIGURE 9. As shown therein, the stud head 36 comprises a neck 44 that is particularly adapted to be disposed in frictional engagement with the keeper 28 in the narrow portion thereof. This neck or neck portion 44, in the embodiment of FIGURES 2–4 and 9, as well as in the other embodiments hereinbefore and hereinafter described, disclosed, shown and illustrated, is of generally cylindrical configuration.

Particular reference now is made to FIGURES 14–18, wherein like reference characters indicate like parts, but wherein the prefix "1" is added, there is illustrated therein another embodiment of foundation garment constructed in accordance with the principles of this invention, and designated by the reference character 100.

In this embodiment, the keeper panel is defined by the foundation garment itself, and the key-hole-shaped aperture 126 is cut out of the material from which the garment 100 is fabricated. The keeper 128, which again may be fabricated of metal or plastic, lines and reinforces the aperture at and about its periphery, and may be affixed to the garment in any suitable manner.

The stud member 134 is, in this embodiment, fabricated of a separate piece of material of any suitable type, and is affixed to the garment 100 on the inside surface thereof in any suitable manner, as through the medium of stitching 46.

In all other respects, the embodiment disclosed, shown and illustrated in FIGURES 14–18 is substantially the same as the embodiments and modifications hereinbefore described, disclosed, shown and illustrated. Accordingly, it will be understood that the teachings of FIGURES 10–13 are equally applicable here concerning the form and configuration that may be taken by the aperture 126, the keeper 128 and the stud head 136. If a certain aesthetic appearance is desirable, then suitable stitching (not shown), such as that shown in FIGURES 7 and 8 may be disposed about the fastener assemblies 120 and 122.

The teachings of the FIGURES 5 and 6 are also applicable to the embodiment of fastener assembly described, disclosed, shown and illustrated in FIGURES 14–18. Thus, and with particular reference now to FIGURES 19 and 20, wherein like reference characters indicate like parts, but wherein the reference characters are preceded by the prefix "1" and are primed, it will be seen that the fastener assemblies 120', 122' can be mass produced in the form of a strip, for example, by any suitable manufacturing technique or process. The stud members 134' (and their stud heads) can subsequently be affixed to the strip, and the latter then severed at predetermined locations to produce a substantial quantity of the fastener assemblies 120', 122'. As clearly shown in FIGURE 20, the fastener assemblies 120' and 122' may then be affixed to the foundation garment 100' on the inner surface thereof in any suitable manner, as through the medium of the stitching 138'. The stitching will extend completely about the periphery of the fastener assemblies, including a portion that corresponds with the lower edge of the foundation garment. Within the confines of the stitching, however, the keeper panel 124 can be separated from the fabric of the garment, so that the stud head can still be inserted through the aperture.

It has been hereinbefore pointed out that foundation garments and fastener assemblies constructed in accordance with the principles of this invention are constructed and arranged to enable at least a portion of the fastener assemblies to be fabricated as an integral part or element of the foundation garment. Thus, in the embodiment of FIGURES 14–18, the keeper panel is integrally fabricated of the material from which the garment is manufactured. In other of the embodiments hereinbefore described and disclosed, the fastener assemblies are completely separately fabricated, and then attached or affixed to the foundation garment in any suitable manner, as by stitching. Irrespective of whether the fastener assemblies are completely separately fabricated of the foundation garment, or at least a portion thereof is fabricated integrally therewith, at least a portion of the foundation garment overlaps a portion of the welt of the stockings or hosiery to be removably supported thereby. Accordingly, the present invention relies upon the elasticity or distensibility of the foundation garment and of the hosiery to provide the necessary "give" or "stretch" there between the wearer assumes different attitudes and positions. This is in direct contradistinction to conventional foundation garments and hosiery supporters, wherein a separate connecting strip of elastic material is relied upon. In accordance with these principles, it has been found that there is a substantial reduction in "riding," "bunching," or "wrinkling" of the hosiery or stockings upon the legs of the wearer. In addition, it has been found that this construction and arrangement substantially reduces "riding" or "bunching" of the foundation garment upon the wearer's torso, particularly in the area known as the thighs. Still further, it has been found that this construction and arrangement of foundation garment and fastener assembly results in a downward force or pull by the stockings or hosiery, and an upward force or pull by the foundation garment, of sufficient magnitude to urge the fastener assemblies towards the legs of the wearer's body, and into the flaccid tissue of the thighs at that location. Additionally, the construction and arrangement of the fastener assemblies is such as to present a device of this type that is a relatively minimal thickness. It has been found that these features combine to substantially reduce, if not completely eliminate, the ever present unsightly "bulge" visible through an outer garment. It will be understood, thereof, that fastener assemblies of the present invention are virtually invisible, that is, inconspicuous during use.

That a foundation garment comprising fastener assemblies constructed in accordance with the principles of the present invention insures that the latter are virtually inconspicuous during use is insured because the fastener structure is positioned at a lower marginal portion of the garment. Such fastener structure will not, therefore, be visible during use irrespective of the assumed attitude of the wearer, such as a sitting or bending position, and style trends, for example, extremely short outer garments. The terminology "virtually invisible or inconspicuous during use" is therefore to be construed accordingly, and is to be given the broadest possible interpretation.

With respect to giving the language used herein the broadest possible interpretation, it will also be understood that the terminology "at a lower marginal portion of the foundation garment," and other similar language, is not to be interpreted as meaning at the lower edge thereof. Thus, and with reference to the embodiment shown in FIGURES 1–4 and 9, the garment 10 could be provided with a recess in the body thereof above its lower edge. The keeper portion 24 of the fastener assemblies would thus be inserted into the recess and secured to the garment in any suitable manner, such as by stitching, heat sealing, and the like. This would depend on the material from which the keeper portion is fabricated. In this instance, the stud portion 34 would be fabricated separately of the keeper portion 24, and would be connected thereto in any suitable manner. The configuration of the recess and the corresponding shape of the keeper portion may, of course, vary, and for example may take the form of a key-hole, an annulus, a tear drop, a diamond, and the like.

Figure 19:
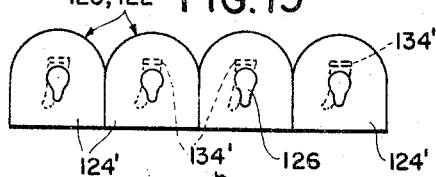
FIGURE 19 is a schematic view illustrating an additional embodiment of fastener structure that can form an element of a foundation garment constructed in accordance with the principles of the present invention.
Figure 18:
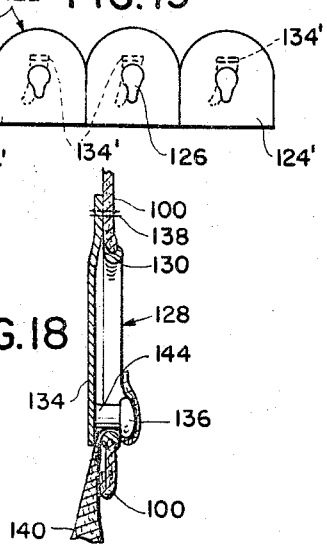
FIGURE 18 is a cross-sectional view taken on the line 18—18 of FIGURE 17.
Figure 20:
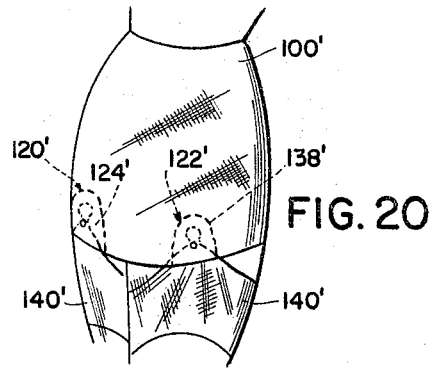
FIGURE 20 is a perspective view of such a foundation garment comprising, as an element thereof, the fastener structure shown in FIGURE 19.

Alternatively, the keeper portion 24 may be a separate element attached to the garment 10, as illustrated in FIGURES 19 and 20, and applied to the garment above its lower edge, but adjacent the lower marginal portion thereof. Again the shape may vary. In this instance, the stud portion 34 may be fabricated integrally with the keeper portion. Or, the stud portion may be a separate element and attached thereto in any suitable manner. It may even be connected to the garment. In this connection, it is to be understood that it is within the scope of the present invention to arrange the stud portion so that it will fold inwardly of the garment, whereby the stud head 36 will extend outwardly thereof, or outwardly of the garment so that it will extend inwardly thereof when it is disposed in operative relationship with the keeper portion.

While the invention has been shown, illustrated, described and disclosed, in terms of embodiments or modifications which it has assumed in practice, the scope of the invention should not be deemed to be limited by the precise embodiments or modifications herein shown, illustrated, described and disclosed, it being understood that other embodiments or modifications are intended to fall within the scope and ambit of the principles of the invention.

For example, it is conceivable that the keeper panels, such as the panel 24, be fabricated in the form of a gore or gusset particularly adapted to be disposed between other panels of foundation garments that are especially constructed and arranged to restrict or reduce distensibility in certain directions. Such other embodiments are intended to be reserved especially as they fall within the spirit and scope of the appended claims.

What is claimed is:

1. A foundation garment, such as a girdle, panty-girdle and the like, comprising, in combination at least one fastener assembly comprising, in turn, a keeper panel connected with a portion of said foundation garment adjacent a lower marginal portion thereof, said keeper panel having a keeper element lining and re-enforcing an aperture extending therethrough; and a stud member having a stud head extending therefrom for cooperation with said keeper element adjacent the lower marginal portion of said foundation garment, enabling hosiery to be firmly held and gripped by and between the keeper panel and stud member in at least a partially overlapping relationship with the foundation garment at the lower marginal portion thereof.

2. In the combination as defined in claim 1, wherein: the keeper panel is separately fabricated and is connected to the foundation garment.

3. In the combination as defined in claim 2, wherein: the foundation garment is provided with at least one recess at the marginal portion thereof, the configuration of which corresponds to that of said keeper panel.

4. In the combination as defined in claim 2, wherein: said keeper panel is connected to the foundation garment interiorly thereof.

5. In the combination as defined in claim 1, wherein: the stud member is formed integrally with the keeper panel and extends therefrom.

6. In the combination as defined in claim 1, wherein: the stud member is a separate element and is connected to the keeper panel.

7. In the combination as defined in claim 1, wherein: the stud member extends downwardly of said keeper panel from a lower edge thereof that coincides generally with the lower marginal portion of said foundation garment, and is foldable along the length thereof; and wherein: said stud head is positioned on the stud member and extends inwardly of the foundation garment, enabling the head, when the stud member is folded inwardly of the garment and disposed in an operative position relative to the keeper panel, to extend outwardly of the garment.

8. In the combination as defined in claim 1, wherein: the stud member is connected to the keeper panel interiorly thereof and above the wide portion of the aperture, and extends towards a lower edge thereof that coincides generally with the lower marginal portion of the garment; and wherein: the stud head is mounted on the stud member and is adapted to extend outwardly of the garment when the stud member is disposed in an operative position relative to the keeper element.

9. In the combination as defined in claim 1, wherein: the keeper panel is fabricated integrally with said foundation garment.

10. In the method of fabricating fastener assemblies particularly adapted for use with foundation garments, such as girdles, panty-girdles, and the like, comprising at least the steps of:
fabricating a strip of material having a plurality of similarly configured apertures therein;
connecting a plurality of stud members to said strip of material at a location adjacent to each of said apertures;
severing the strip at predetermined locations to define a plurality of fastener assemblies particularly adapted to be operatively associated with a foundation garment.

References Cited

UNITED STATES PATENTS

| | | | |
|---|---|---|---|
| 1,388,098 | 10/1921 | Connor | 2—240 |
| 1,833,163 | 11/1931 | Ichinger | 2—239 |
| 2,136,250 | 11/1938 | Peck | 128—535 |
| 2,143,815 | 2/1939 | Scheinberg | 128—535 |
| 2,700,766 | 2/1955 | Rosenberg | 128—521 |
| 2,806,221 | 9/1957 | Dorsey | 128—521 |

ADELE M. EAGER, *Primary Examiner.*